«12» United States Patent
Chen et al.

«10» Patent No.: US 7,050,400 B1
«45» Date of Patent: May 23, 2006

«54» END-TO-END CONNECTION PACKET LOSS DETECTION ALGORITHM USING POWER LEVEL DEVIATION

«75» Inventors: Bing Chen, Westfield, NJ (US); David Beaumont Ramsden, Wall, NJ (US)

«73» Assignee: AT&T Corp., New York, NY (US)

«*» Notice: Subject to any disclaimer, the term of this patent is extended or adjusted under 35 U.S.C. 154(b) by 956 days.

«21» Appl. No.: 09/801,481

«22» Filed: Mar. 7, 2001

«51» Int. Cl.
*H04L 12/26* (2006.01)

«52» U.S. Cl. .............. 370/250; 370/473; 379/27.03

«58» Field of Classification Search ........... 370/241.1, 370/248, 249, 250, 252, 253, 473; 379/10.01, 379/10.02, 10.03, 21, 27.04, 27.03
See application file for complete search history.

«56» References Cited

U.S. PATENT DOCUMENTS

| | | | | |
|---|---|---|---|---|
| 4,393,491 A | * | 7/1983 | Ashlock et al. | 370/249 |
| 5,450,449 A | | 9/1995 | Kroon | 375/350 |
| 5,793,976 A | | 8/1998 | Chen et al. | 395/200.54 |
| 6,370,120 B1 | * | 4/2002 | Hardy | 370/252 |
| 6,553,061 B1 | * | 4/2003 | Hardy | 375/220 |

* cited by examiner

*Primary Examiner*—John Pezzlo
*Assistant Examiner*—Donald L Mills

«57» ABSTRACT

A method is described for detecting total end-to-end loss of data packets in a packet network that does not require direct access to the packet network. A test signal is generated at a source end point indirectly coupled to the packet network. The test signal is transmitted over the packet network to a destination end point also indirectly coupled to the packet network. At the destination end point a modified test signal is received and examined to detect irregularities and then processed to determine whether the irregularities in the recorded signal represent packet loss.

8 Claims, 5 Drawing Sheets

END-TO-END CONNECTION PACKET LOSS DETECTION ALGORITHM USING POWER LEVEL DEVIATION

FIELD OF THE INVENTION

The present invention relates to communication networks, and in particular to using a signal with power level variations to detect packet losses in communication networks.

BACKGROUND OF THE INVENTION

Packet switching networks transmit digital information between sources and destinations known as end points. The end points can be directly connected to the packet network or they may be indirectly linked through an intermediary non-packet network such as a local loop of a telephone network. When the end points are directly connected to the network, a source end point creates packets, each packet having a data portion and a routing information portion. The packets are then transmitted to an input port of the packet network. Similarly, end points that are not directly connected to a packet network transmit non-packetized data which is subsequently packetized at an input port of the packet network.

The packet network includes a plurality of interconnected nodes which receive the packets in succession; and based on the routing information within each packet, each node selects a path to another node or a network output port. As packets traverse a packet network from input ports through intermediate nodes to output ports, they may become unusable or lost. In general, congestion at network nodes is a main cause of packet loss. As buffer space is quickly used up at the nodes, an overload condition may occur, resulting in either a delay in transmission or loss of data.

From the standpoint of the destination end point, packet loss causes inaccuracies in the data signal stream received from the source end point. In some cases, when packets are dropped, the received data stream reveals a gap in the received signal, which is easy to detect. In other cases, packets may be immediately substituted for the unusable packets, concealing the packet loss. The substitute packets may be the last usable packet or a new packet may be generated according to an algorithm that uses information from the last packet and possibly the next packet to estimate the lost data by interpolation.

To improve the quality of data transmission in packet networks, techniques have been developed to identify packet loss. One technique uses packet monitoring systems connected to nodes of the packet network to transmit special packets to measure packet loss. In another technique, packet loss is detected by monitoring normal packets in the network and checking the sequence numbers of the packets to determine if any packets have been lost. These techniques require access to the packet network being evaluated and suffer from the further disadvantage that they may not identify packets lost after the point at which they are connected to the network. As a result, they may not provide a fully accurate measurement of end-to-end network performance.

SUMMARY OF THE INVENTION

The present invention provides a method for detecting total end-to-end loss of data packets in a packet network that does not require direct access to the packet network. A test signal is generated at a source indirectly coupled to the packet network. The test signal is transmitted over the packet network to a destination also indirectly coupled to the packet network. At the destination, a modified test signal is received and examined to detect irregularities and then processed to determine whether the irregularities in the recorded signal represent packet loss.

The method according to the present invention further provides that the test signal includes repeating sections, with each section including a limited number of segments. The length of each segment is arranged to equal the packet size used by the packet network. If the packet size is unknown, the length should be equal to the smallest packet size typically used. In IP networks which support voice traffic, a frame of speech, usually a 10 ms sampling, is typically encoded into the data bits of a single packet. The 10 ms time period is chosen as a trade-off between limiting the amount of in-network delay added to the call, while maximizing the data bits included in each packet. The length of the repeating section is arranged to be large enough so that packet loss concealment methods will not be able to extract the actual power level of the lost packets from the packets before and after the lost packets. The signal is also designed so that the encoded average power level of each segment is detectably different from average power levels from each of the other segments in a given section. In an implementation, the segment length is set at 10 ms and the section length is set at 40 ms.

In a particular embodiment, expected power levels for each segment in the repeating sections of the test signal are calculated. The power level of each segment is compared with its expected power level, and a difference between the two levels is obtained. If the difference is greater than a threshold, packet loss is detected. The threshold is chosen based on the fluctuations of the power levels on the network.

The source and destination end points of a telephone network, such as customer premises equipment, and the test signal may be implemented as an analog or digital signal customarily transmitted over a telephone network.

The present invention also provides a device for generating a test signal used for detecting total end-to-end loss of data packets in a packet network. The device includes a signal generator configured to generate a test signal having repeating sections of segments. The device includes a transmitter adapted to be indirectly coupled to a packet network.

Additionally, the present invention provides a device for detecting total end to end loss of data packets in a packet network. The device includes a signal receiver, a recording unit for recording test signals received by the receiver, and a processor configured to analyze the recorded test signal, to determine if packet loss occurred during transmission of the signal through the packet network and to report test signal packet loss statistics.

DETAILED DESCRIPTION

In accordance with the present invention, a test signal, containing repeating segments of data, is generated at a source end point and sent to a destination end point through an intermediary packet network. At the destination end point, the test signal is received, then recorded and processed to determine whether packets of data from the original signal were lost in transit in the packet network and, if so, where in the signal the packet loss occurred. During processing, a signal correlation method is used between the received signal and a small portion of the start of the original signal to find the exact starting point of the received test signal. From this start point, the power of each segment in the received test signal is calculated based on the amplitude of the signal. Based on the median power of several segments of several sections, the expected power pattern is detected. Each segment's power level is compared with the expected power level of the pattern from the start point. If the difference of the actual power and the expected power exceeds a threshold for a given segment, packet loss is deemed to have occurred at that segment.

Figure 1:
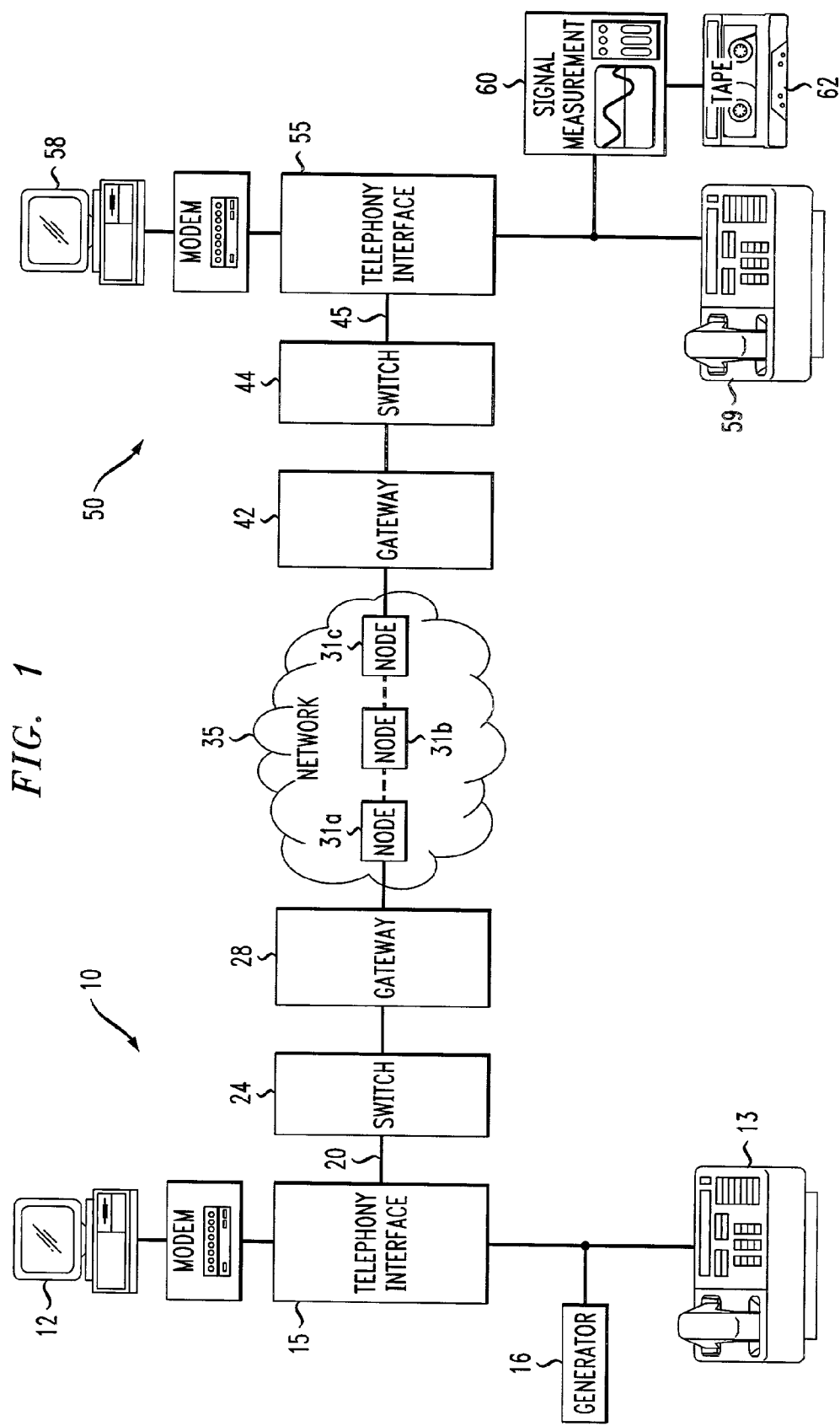
FIG. 1 shows an end-to-end communication system according to an embodiment of the present invention.

FIG. 1 is a schematic illustration of a network system through which a voice/data test signal may travel from a source end point to a destination end point. Source endpoint 10 is an exemplary residential or business unit equipped with a personal computer 12 and a telephone 13, each coupled to a telephony interface 15. The interface 15 may be a RJ-11 jack, providing a DS-0 connection for the telephone 13 and either a DS-0 or DS-1 connection for the PC 12. The PC 12 may include a sound card having digital signal processing capabilities. Either the PC (via the sound card) or a separate test signal generator 16 generates a test signal directed to a designated destination end point 50. The specific properties of the original test signal are described below. If the PC 12 is used to generate a digital test signal, during the generation of the signal, a voice codec, such as G.711, the ITU-T standard algorithm for transmission of PCM voice at bit rates up to 64 kbps, is used to encode the voice information into the signal, which is then transmitted digitally through the telephony interface 15 through the local loop 20 to a local switch 24. Alternatively, if the test equipment 16 or the PC 12 are used to generate analog test signals, voice encoding is performed within the telephony network at a local switch 24 or Gateway 28. The local switch may be, for example, a class 5 switch operated by a local exchange carrier. From the local switch 24, the test signal may pass through various other nodes and switches within the PSTN before reaching the Gateway 28.

At the Gateway 28, the signal, made up of a continuous bit stream of data, is packetized. The Gateway 28 generates packets using IP (Internet Protocol) or ATM (Asynchronous Transfer Mode) format depending on the type of packet network 35 used for transmission. In an IP implementation, the sizes of the packet, i.e., the amount of voice/data they contain, are typically between 10 and 30 ms. From the Gateway 28, the test signal enters the packet network 35 which includes a distributed set of nodes 31a, b, c, such as routers. Although only three nodes are shown, this is for illustrative purposes, and any number of intermediate nodes can be used in conjunction to establish a virtual path through the packet network 35.

As the packetized test signal traverses the nodes 31a, b, c of the packet network 35, packets may be lost along the virtual path through the network to the destination local loop 45. At the output gateway 42, the packet stream is de-packetized into a digital bit stream and transmitted to a destination local switch 44. The local switch routes the reconstructed signal to the telephony interface 55 at the destination 50. At the destination 50, either signal measurement equipment 60 coupled to a DS-0 line attached to a telephone 59 or a signal measurement application running in association with a PC 58 sound card intercepts the reconstructed test signal when it reaches the telephony interface 55. The signal is immediately recorded by the PC 58 or by signal recording equipment 62. The recorded signal may be processed in real-time, concurrently with recording, or subsequently. To assist in the processing of the test signal, the PC 58 or the signal measurement equipment generates a small sample of the original source test signal in accordance with a predefined algorithm shared with the source signal generators 12, 16.

The test signal is designed to be sensitive to packet loss. Changes in the power pattern of a recorded test signal identify when a packet has been replaced. In one embodiment, a 1004 Hz tone is used as the test signal, but tones using other frequencies or speech-like signals, such as the composite source signal described in ITU-T G. 168, can also be used. More specifically, the signal is designed so that the average power level of each packet (when the signal is packetized) is different from that of adjacent packets, and the number of sequential packets is large enough that packet loss concealment techniques should not be able to extract the actual power level of the lost packet from the adjacent packets. In an IP implementation, in which packets store between 10 and 30 ms of voice data (the amount of time stored being proportional to the number of bits in the packet), the basic unit size of the test signal is equal to the smallest IP packet size in units of time, 10 ms, and the systematic power level variation is 40 ms, greater than the longest IP packet size of 30 ms. Thus, the test signal has four distinct 10 ms segments, each having a different average power level, which is repeated for the duration of the signal.

Figure 2:
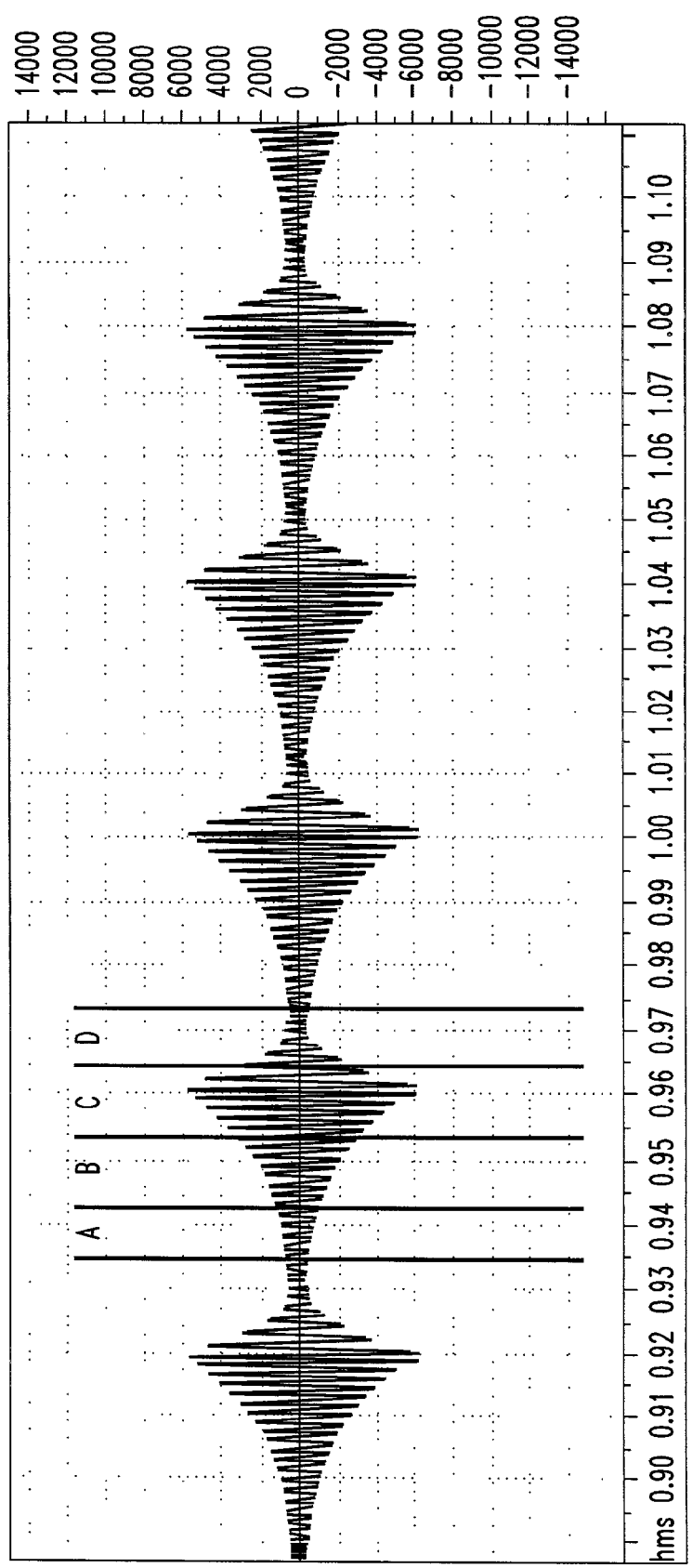
FIG. 2 shows the amplitude of a portion of an original test signal according to an embodiment of the present invention.

FIG. 2 shows five repetitions of an exemplary test signal according to an embodiment of the invention. The horizontal axis represents time in milliseconds and the vertical axis represents the amplitude of the test signal which corresponds to the signal's power level. The second repetition is divided into four 10 ms sections labeled A, B, C and D. In each 10 ms section, the average power level is gradually changed to avoid abrupt changes in the power level between the segments. Table 1 shows the average power level of each of the four repeating segments of the original test signal.

TABLE 1

| Segment | Average Power Level |
| --- | --- |
| A | −30 |
| B | −20 |
| C | −10 |
| D | −40 |

Figure 3:
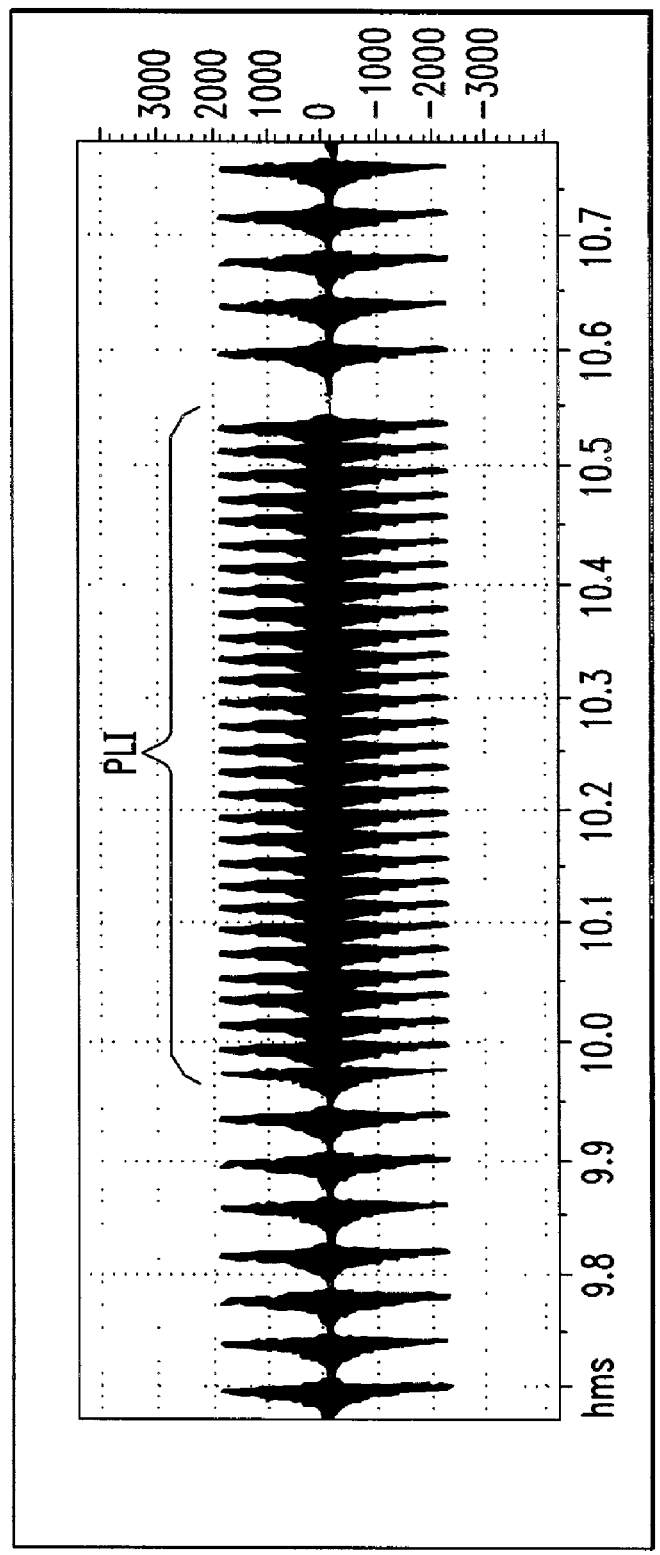
FIG. 3 shows a graph of a recording of the test signal shown in FIG. 2 after being transmitted through a packet network. This graph shows a period where packet loss has occurred and the lost packets are concealed by playing the last good packet repeatedly.

FIG. 3 shows an exemplary graph of a recorded test signal after it has been processed using the G.711 codec after it has passed through a packet network. The graph shows the repeating four-segment patterns on left and right side sections which indicates no packet loss has occurred. The middle section of the graphs shows a packet loss in the form of a repeating pattern of part of the test signal (note that the low amplitude tail of the signal is omitted in the repeating error). In this particular call, a single packet loss burst occurs which begins at approximately 9.9 seconds and lasts 560 ms before terminating with a silence. The distortion that can be seen in the middle section, denoted PL1, is a consequence of the packet replacement technique used to conceal the packet loss.

Figure 4:
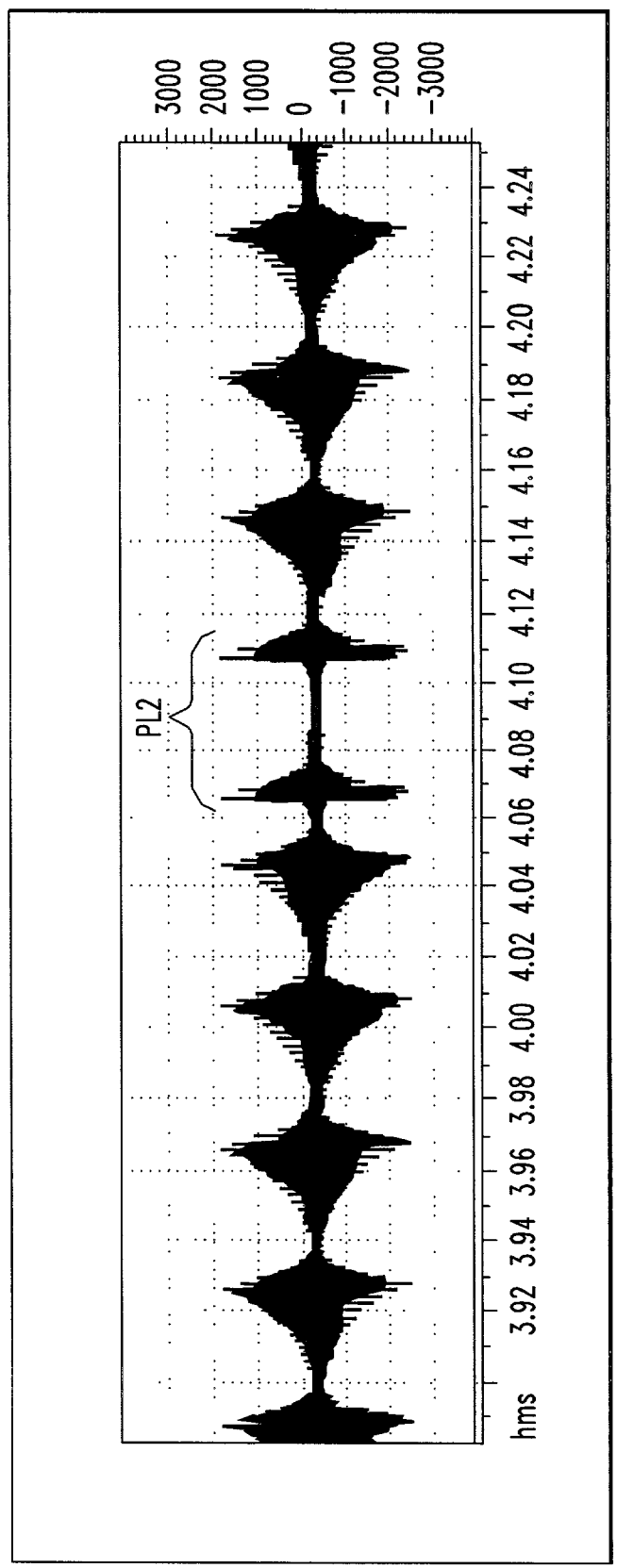
FIG. 4 shows another recording of the test signal shown in FIG. 2 after being subjected to packet loss in the packet network, according to an embodiment of the present invention.

FIG. 4 shows a packet loss, denoted PL2, on a smaller time scale (20 ms of signal is repeated followed by 20 ms of silence) with a shift of the signal forward by 20 ms.

Figure 5:
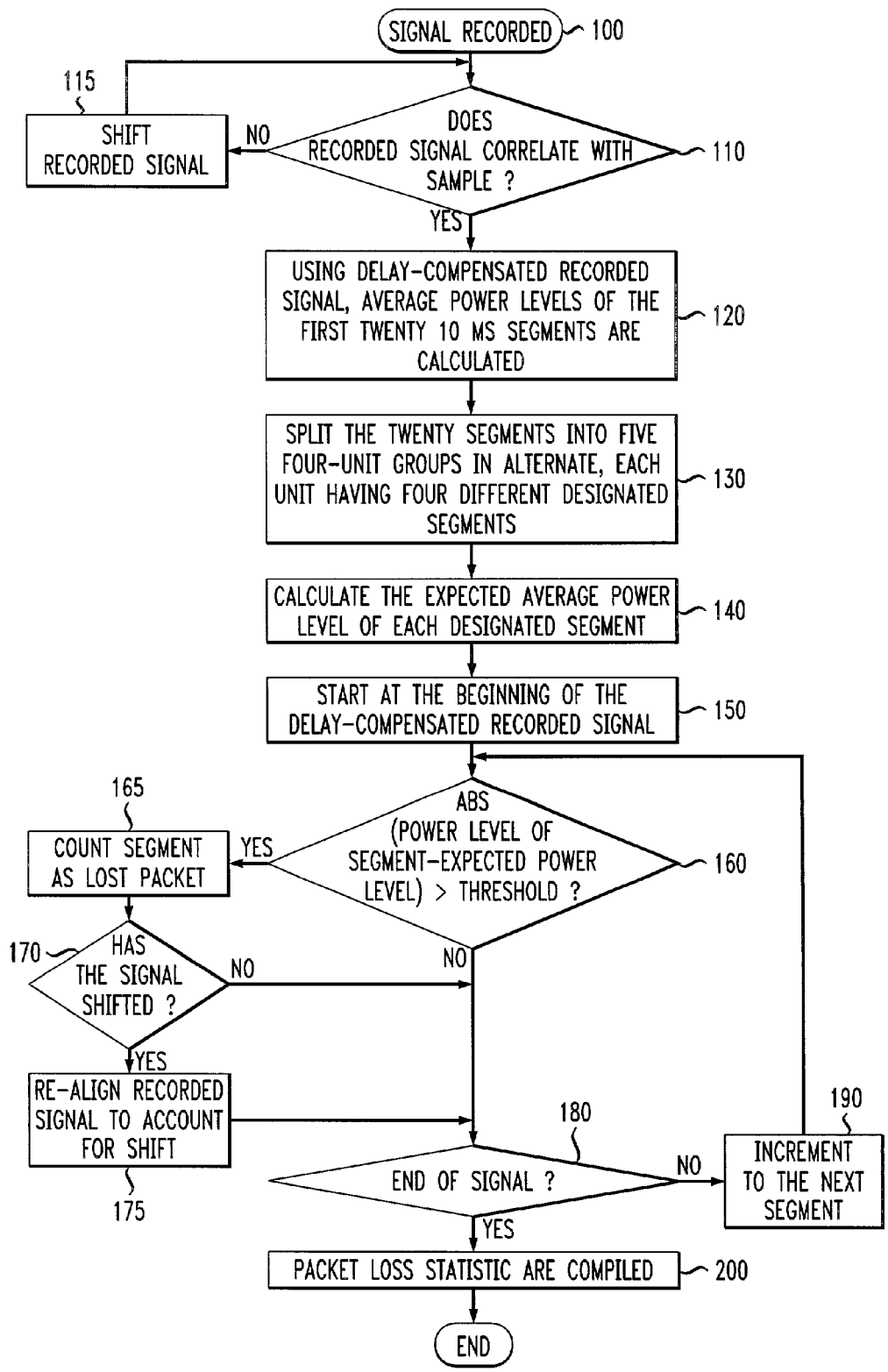
FIG. 5 shows a flow chart of the packet loss detection method according to an embodiment of the present invention.

An embodiment of the signal processing method according to the present invention is shown in FIG. 5. After a reconstructed signal has been recorded at the destination end point 50 (step 100), the delay between the recorded file and the original source file is determined, in step 110, by running a correlation analysis of the recorded file against the small 500 ms sample of the source file generated at the destination end point. An initial estimate of the start of the test signal is determined by comparing the received signal's power to a threshold. If the sample and the received signal do not correlate, in step 115, the recorded signal is shifted vis a vis the source signal and a correlation of the recorded signal and the sample is redetermined (step 110). When the signals do correlate, in step 120, the first twenty (20) 10 ms segment packets of the delay-compensated recorded signal are calculated. Because the original signal includes repeating elements A, B, C, and D, the twenty calculated segments are grouped according to modified repeating segments A', B', C' and D' (step 130). Table 2 shows an exemplary sample of twenty calculated power levels.

TABLE 2

| Segment | Calculated Power Levels | | | | |
|---|---|---|---|---|---|
| A' | −28 | −28 | −28 | −28 | −30 |
| B' | −34 | −35 | −35 | −35 | −35 |
| C' | −25 | −25 | −25 | −25 | −25 |
| D' | −14 | −15 | −15 | −15 | −15 |

In step 140, the expected average power level for each segment A', B', C' and D' is calculated by finding the median value of the five samples taken of each segment. The rank order of the power levels of the four segments should correspond with the rank order of the original signal's power levels. Five repetitions of the signal are used to limit the possibility that packet dropping will impact the calculation, the assumption being that packet loss will cause variation in individual power levels in either a positive or negative direction, but the median value should not be affected. The expected values are −28, −35, −25 and −15 for A', B', C', and D' respectively. In this example, the expected values differ from the original values shown in FIG. 2 because of loss in the packet network 35 and also because the packets used to encapsulate the test signal by the packet network do not line up with the segments of the signal.

In Table 2, several of the values vary from the expected median value, each of these values A'=−30, B'=−34 and D'=−14 may represent segments where packet loss has occurred. Using the expected power levels taken from the twenty-segment sample, starting at the beginning of the recorded signal (step 150), in step 160, the power level of each segment is compared with the segment's expected power level.

If the difference is greater than a threshold level, which can be chosen as an adjustable tolerance range of, for example, 1 dB, then packet loss is deemed to have occurred at that segment, and in step 165 is counted as a lost packet. In some cases, after a burst packet loss occurs, the recorded signal is shifted, and it must be re-aligned so that the next good packet is compared with the correct expected power level. In step 170, it is determined whether a shift has occurred; and if so, in step 175 realignment takes place. Due to the fact that the pattern repeats every four packets, or 40 ms, shifts of greater than 40 ms will only cause the signal to be realigned by 10, 20 or 30 ms to resynchronize the received signal with the expected pattern. After realignment is performed, and after a power level of a segment is compared to its expected value and no packet loss is detected, the signal is incremented to the next segment (step 190) unless the end of the recording has been reached (step 180), in which case (step 200) the total packet loss statistics for the recorded transmission are compiled in a report. The statistics include the location of each lost packet, the duration of the loss and the overall loss rate.

In the foregoing description, the method and system of the invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. For example, although an exemplary segment size of 10 ms has been used, the segment size used in the test signal can be adjusted to account for variations in packet sizes used in various packet networks. Additionally, although a four-segment repeating pattern was described, the pattern may include five or more repeating segments. The specification and the drawings are accordingly to be regarded in an illustrative rather than in a restrictive sense.

What is claimed is:

1. A method for detecting total end-to-end loss of data packets in a packet network, comprising the steps of:

generating a test signal at a source end point coupled to the packet network, the test signal having a predefined pattern of variation in average power level;

wherein the test signal includes repeating sections, the sections further including number of segments, the length of each segment equal to the smallest packet size in the packet network;

wherein the lengths of the repeating sections are greater than the largest packet size in the packet network;

wherein the average power level of each segment is detectably different from average power levels of each of the other segments in a given section;

wherein the segment length is set to optimize an amount of data bits included in packet taking into account in-network delay, and the section length is equal to four times the segment length;

transmitting the test signal over the packet network to a destination end point coupled to the packet network;

recording the test signal at the destination end point;

examining the recorded test signal to detect irregularities using the predefined pattern of variation as a standard;

determining whether the irregularities in the recorded signal represent packet loss;

calculating an expected power value for each segment in the repeating sections of the test signal;

comparing a difference between the power level of a segment and its expected power level against a threshold;

wherein if the difference is greater than the threshold, packet loss is detected.

2. The method of claim 1, wherein the source end point and the destination end point are end points of a telephone network, and the telephone network is coupled to the packet network through gateway nodes.

3. The method of claim 2, wherein the test signal is one of a 1004 Hz tone signal and a composite source signal.

4. The method of claim 2, further comprising:
encoding the test signal before transmission to the destination end point using a voice codec.

5. The method of claim 4, wherein the codec is, G.711.

6. The method of claim 1, further comprising:
determining whether burst packet loss has altered the alignment of the recorded signal; and
realigning the recorded signal to correct for any alteration.

7. The method of claim 1, further comprising:
generating a small sample of the original signal at the destination end point according to a shared algorithm;
correlating the recorded signal with the sample to calculate a delay; and
compensating the recorded signal for the calculated delay.

8. The method of claim 1, wherein the step of calculating the expected power level of a segment includes:
selecting a sample of repeating sections from a recorded signal;
classifying segments within a section in groups with corresponding segments from the remaining selected sections; and
determining the median values for each group, the median value being identified as the expected power level for the segment group.

* * * * *